United States Patent [19]

Tavazza et al.

[11] Patent Number: 4,945,967
[45] Date of Patent: Aug. 7, 1990

[54] REINFORCING ARMOURING OF TIRES FOR VEHICLE WHEELS

[75] Inventors: Giuseppe Tavazza, Milan; Luigi Maiocchi, Vernate fraz. Moncucco, both of Italy

[73] Assignee: Pirelli Coordinamento Pneumatici S.p.A., Italy

[21] Appl. No.: 177,449

[22] Filed: Apr. 4, 1988

[30] Foreign Application Priority Data

Apr. 28, 1987 [IT] Italy ............... 20292 A/87

[51] Int. Cl.$^5$ ............................. B60C 9/22
[52] U.S. Cl. ..................... 152/531; 152/536; 152/538
[58] Field of Search .............. 152/527, 531, 533, 535, 152/536, 538

[56] References Cited

U.S. PATENT DOCUMENTS

| | | | |
|---|---|---|---|
| 3,977,172 | 8/1976 | Kerawalla | 57/237 |
| 4,155,394 | 5/1979 | Shepherd et al. | 152/556 X |
| 4,169,495 | 10/1979 | Maiocchi | 152/531 |
| 4,183,391 | 1/1980 | Romand | 152/538 X |
| 4,219,601 | 8/1980 | Inoue et al. | 428/295 X |
| 4,293,019 | 10/1981 | Maiocchi | 152/531 X |
| 4,420,025 | 12/1983 | Ghilardi et al. | 152/531 X |
| 4,518,023 | 5/1985 | Yamaguchi et al. | 152/531 X |
| 4,564,055 | 1/1986 | Ghilardi | 152/526 X |

FOREIGN PATENT DOCUMENTS 2064445 6/1981 United Kingdom ............... 152/531

Primary Examiner—Raymond Hoch
Attorney, Agent, or Firm—Stevens, Davis, Miller & Mosher

[57] ABSTRACT

A tire with a radial carcass having a breaker structure that comprises two radially overlapped layers of metallic fabric reinforced by cords transversely disposed with respect to the circumferential direction of the tire. These cords are crossed over each other and, on each axial extremity of the two layers, there is positioned at least a rubberized fabric strip reinforced by metallic cords of high elongation (HE) or very high elongation (VHE) in combination with Hybrid textile cords (Aramide/Polyamide) disposed in the circumferential direction and having, in the vulcanized tire, a modulus of elongation of non-increasing value passing from the axially outermost cord to the axially innermost one. This strip is suitably constructed by the coupling of cords of (axially from the outside to the inside) HE-VHE (High Elongation—Very High Elongation), HE-Hybrid (High Elongation—Aramide/Polyamide) and VHE-Hybrid.

9 Claims, 2 Drawing Sheets

REINFORCING ARMOURING OF TIRES FOR VEHICLE WHEELS

The present invention relates to tires for vehicle wheels and specifically to tires of radial type, that is those provided with a carcass wherein the reinforcing cords of said carcass lie on radial planes, containing the tire axis, extending from one tire bead to another.

This type of tire comprises also a circumferential, reinforcing armoring, generally known as breaker, disposed within the tire and interposed between the tread band and the carcass of said tire.

As is well known, the breaker structure affects both the behavior characteristics of the tire and its life, particularly the rate and regularity of wear of the tread.

More specifically, the invention relates to those breaker structures particularly adopted for tires having a high capacity load comprising at least two layers of metallic cords radially overlapped, axially extending along almost all the tread band width, at each extremity provided with a further reinforcing ring, radially and outwardly disposed in respect to the lower layers, constituted by one or more strips of textile cords or metallic cords having high elongation, circumferentially oriented, that is parallel to the equatorial plane of the tire.

The reasons for which the cords of the reinforcing lateral strips must be of high elongation type, that is more extendable than those utilized to reinforce the layers, are different and very well known to the technicians: on the other hand, the main reason to which all others can be connected is that the lesser modulus (greater extensibility) of the cords of the strips must compensate for their better efficiency in supporting the circumferential tensile stresses, this efficiency being due to their circumferential direction, in respect to that cords of the layers, which are, transversely oriented, that is inclined in respect to the circumferential direction of the tire.

Thus, by using high modulus cords for the layers and low modulus cords in the strips, there can be constructed breaker layers and strips having a modulus of elasticity of the same general order of size. This will result in homogenous breaker structures which allow, first of all, the molding of raw tire and secondly tires that substantially and evenly resist the stresses to which tires are subjected while running.

It is known that, to obtain satisfactory behavior of the tire during driving, it must be provided with a cross-sectional profile, corresponding to the tread-band, which is at least slightly curved while, to have good regularity of wear the profile must be quite flat, thus causing a road contact patch that is more rectangular than elliptical.

Regularity of wear and the low abradibility have acquired, by the passing of time, a considerable importance for two reasons; the first being the possibility of keeping the costs low, and the second being that due to the technical progress achieved in vehicles, and the improved condition of the roads cause uneven wear to be more noticeable in the behavior of the tire during driving.

The fulfillment of such a requirement is in great contrast with the behavior of the tire during running: in other words, in respect to the present values, a further improvement as to wear regularity can be achieved only by a greater flattening of the tire profile, but this measure causes a considerable loss of sensibility, which is rather important as to desirable driving characteristics (prompt steering response and directional stability) which are, however, somewhat assured thanks to the cross-sectional shape of the tread-band.

The Applicants have now discovered that it is possible to overcome this point of clear discrepancy while improving at the same time both the cited characteristics and without falling down in any of the usual drawbacks, so that the task of the present invention is to obtain a new breaker-structure in tires for vehicle wheels, of the type comprising at least two layers of metallic fabric, radially overlapped and at least a further reinforcing strip, radially disposed at each outer extremity of said two layers. This structure is capable of improving the structure resistance, the wear regularity and the mileage of the tread band, as well as the behavior characteristics of the tire during running.

The object of the present invention is a tire for vehicle wheels comprising a radial carcass, a tread band upon the carcass and a breaker structure between the tread band and the carcass, said breaker structure comprising at least two layers of metallic fabric, radially overlapped, having the same width as that of the tread band and reinforced by cords having an elongation at break comprised between 2.6% and 3.2%. These cords are disposed parallel in each layer and crossed with those of the opposite layer and are symmetrically inclined in respect to the tire longitudinal direction, according to an angle comprised between 10° and 30°, and two reinforcing rings, each ring being disposed at the axial extremity of said breaker structure, in a radial outer position in respect to said two layers. The reinforcing rings or strips are of width comprised between 7% and 40% of the axial width of said breaker structure, each ring comprising at least a strip of rubberized fabric, the latter being reinforced by cords disposed according to the circumferential direction of the tire. The cords have an elongation at break of a value greater than that of the reinforcing cords of said radially innermost layers. In the vulcanized tire, the modulus of the reinforcing cords of said strips present at least two distinct values, the cord-strips with greater modulus being axially outwardly disposed in said strips; the value of said modulus does not increase axially proceeding from the outside to the inside.

In a suitable embodiment of the invention, the strips comprise two groups of reinforcing cords with the modulus of said cords being approximately equal to one another in each group and substantially different from those of the flanked group.

To achieve this characteristic, the cords of the outer group are conveniently lang lay metallic cords, of High Elongation type. In combination with these, the cords of the inner group can be metallic cords of Very High Elongation type or Hybrid textile cords comprising one or more Aramide yarns.

In particular, said Hybrid textile cords can comprise two yarns of Aramide and one of Polyamide, helicoidally twisted together, said Aramide yarns presenting a remaining torsion not exceeding 0.5 turns per inch, said yarn of Polyamide presenting a remaining torsion in the opposite direction with respect to that of the yarns in Aramide not less than to 1.5 turns per inch.

According to a convenient embodiment of the invention, the axial width of the outer group is between 30% and 70% of the total width of the strip.

As far as the assembling of the rings are concerned, these can comprise even more radially overlapped strips and the cords of at least one group of each strip can be distributed in a plurality of radially overlapped bands.

Finally, it has been found convenient that the axially outer edge of said strips substantially coincide with the axially outer edge of the narrower of the two layers in radially inner position.

BRIEF DESCRIPTION OF THE DRAWINGS

The present invention will be still better understood from the following detailed description offered solely by way of non-limiting example, and referring to the figures of the accompanying drawing wherein.

DESCRIPTION OF A PREFERRED EMBODIMENT

Figure 1:
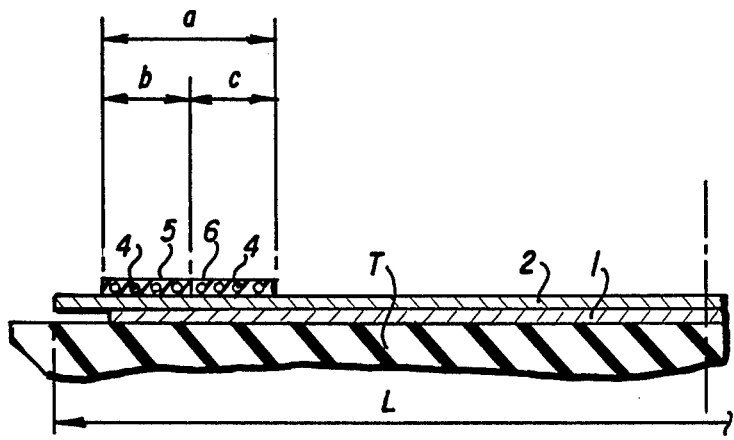
FIG. 1 shows, in cross section, the breaker structure according to the invention as prepared on a tire manufacturing drum.

FIG. 1 illustrates the breaker structure according to the invention in a first embodiment, at the end of the phase of assembling and preparation on the building drum T, this drum having a well-known cylindrical shape, which permits a flat building-up of the breaker structure.

The breaker structure is composed (radially proceeding from the inside to the outside) of a first layer 1 of metallic, low-elongation cords (elongation at break being between 2.6% and 3.2%) disposed parallel to one another inside the layer and inclined according to an angle lying between 10° and 30° in respect to the circumferential direction of the breaker structure.

Over this first layer there is a second layer 2, equal to the previous one and with the reinforcing cords crossed in respect to the cords of the adjacent layer and symmetrically inclined in respect to the circumferential direction of the structure; all this is obviously done following a process well-known to technicians in the art: the width of this second layer can be greater, as per the version shown in the figure, equal or smaller than that of the underlying layer. Nevertheless, it is particularly convenient that the extremities of the two overlapped layers are graduated from one another (from 5 to 10 mm approximately) in order to avoid a marked uneven step in the finished tire in the area of the breaker extremity.

In a radially, outer position in respect to the above discussed first and second layers, near each axial extremity, there is positioned a reinforcing ring 3 comprising at least a strip of rubberized fabric reinforced with cords 4 disposed according to the circumferential direction of the breaker structure and, however, of the tire, that is oriented according to the usual definition, at 0°.

The above mentioned strip comprises two bands 5 and 6, axially flanked, which differ one from the other due to the type of reinforcing cords and thus substantially divide the totality of the 0° cords utilized in the strip in two distinct groups, respectively a first group, that of band 5, situated in an axially outer position in respect to the breaker and a second group, that belonging to band 6, in an axially inner position.

It is particularly convenient to employ in the first group the well known metallic cords having high elongation, that is the so-called HE cords which present an elongation at break of between 4.0% and 8.0%.

In this type of cords the elongation is due to the fact that the cords have the structure of lang lay type and that the single wires in the strands and the strands in the cords are all twisted in the same direction so that the cord can be thought of and, in fact do behave almost like that of helicoidal spring. Under the effect of a tensile axial load, initially the cord supports a strong elongation, thus demonstrating a low modulus; subsequently, when the spring is stretched, the cord produces a strong tensile resistance, comparable to that of the usual metallic cords having high modulus.

According to what is now illustrated, the load-elongation diagram of the high-elongation cords presents a characteristic "bend"; in other words, the above mentioned diagram presents an initial length, almost rectilinear, having low inclination, which produces strong elongations connected to low values of the load, followed by a final length, nearly rectilinear and with a strong inclination, producing—on the contrary—low elongation for strong increases of the load.

The continuous, curvilineal length, having variable inclination of connection between the initial and the final length, takes the name of "bend"; as stated above, it can be easily understood how the elongation of the cords and the bend position, can be governed within certain limits the varying the winding characteristics (number of torsions per decimeter) both of the wires and of the strands in the above mentioned High-Elongation cords of lang lay type.

In relation to the present invention, we will call HE cords those that have a middle of the bend at an elongation around 1.6% (1.6%−0.3).

The very high elongation cords will be called VHE cords which are those presenting the bend of the load-elongation diagram considerably near to high elongation values, substantially at an elongation of around 3% (3.0%−0.5).

It was found to be particularly convenient in the breaker structure according to the invention, for the cords of the second group, that is those belonging to the band 6, to employ of the above mentioned VHE cords.

An alternative solution to the use of VHE cords is conveniently offered by mixed, textile cords comprising yarns in Aromatic/Polyamide (Aramide) and Aliphatic/Polyamide (nylon), said cords being generally and hereinafter defined Hybrid, having a modulus from 3000 to 7000 N (Newton—measured under elongations from 1% to 2%).

In a preferred embodiment according to the present invention, the above mentioned Hybrid cord is constituted by three yarns of mono-filaments wound together with a twist in the opposite direction to that of the winding of the mono-filaments in each yarn.

More precisely, the cord is constituted by two yarns of Aramide and one of nylon: each yarn is between 1000 and 6000 denier with the twist in the finished cord combined together so that the Aramide yarns present a remaining torsion not exceeding 0.5 turns per inch whereas the nylon yarn presents a remaining torsion in the opposite direction, not smaller than 1.5 turns per inch.

Such a Hybrid cord, which has its own modulus, in the initial part of the diagram, larger than that of the previously cited HE metallic cords, after the rubberizing and vulcanizing process, appears, on the contrary, to have a modulus even smaller than that of the metallic cords having very high elongation as already mentioned.

Finally, according to a further embodiment of the invention, the cords of the first group (band 5) can be VHE cords on condition that the cords of the second group (band 6) are Hybrid cords.

It appears evident that the proposed couplings satisfy the essential characteristic of the invention and that they achieve a structure wherein the modulus of elasticity of the single cords of the vulcanized tire does not substantially vary in passing from the axially outer edge to the axially inner edge of the strip or, better, of the reinforcing ring.

DETAILED EMBODIMENT

It is convenient to say that the width "a" of the ring is between 7% and 40% of the width L of the entire breaker structure. The ambit of width "a" is greater that the width "c" of the band 5 (first group of cords) and is between 30% and 70% of the width of the ring.

In fact, lesser widths would not give a satisfactory result as far as breakering is concerned on the extremities of the lower layers whereas larger widths would negatively affect the driving characteristics of the tire.

Figure 2:
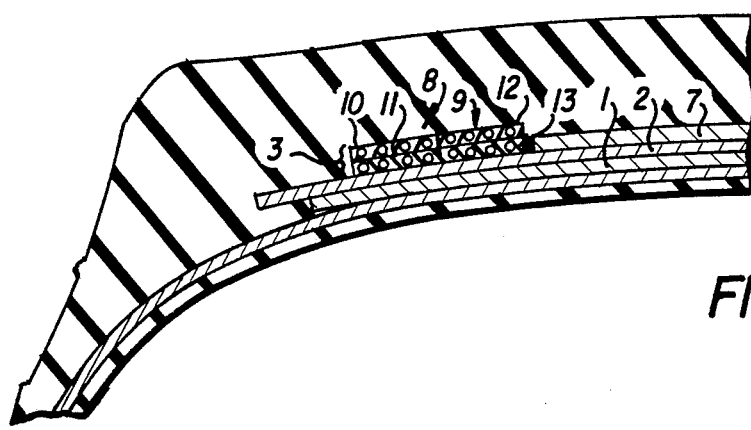
FIG. 2 shows a partial view, in cross-section, of a tire containing the breaker structure according to the invention, in a second embodiment.
Figure 3:
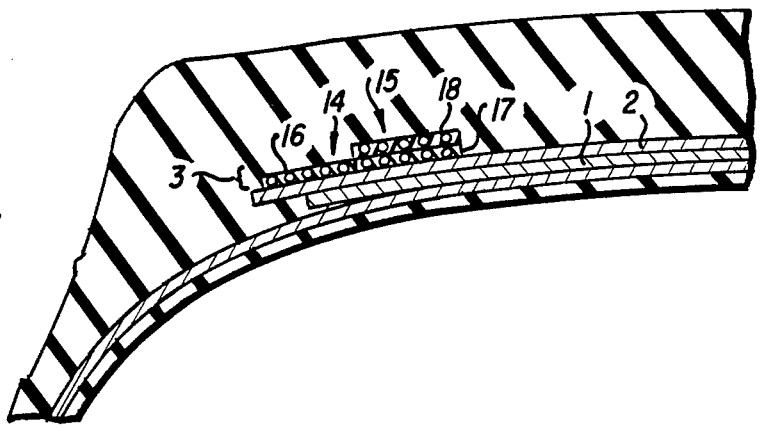
FIG. 3 illustrates a partial view, in cross-section, of a tire containing the breaker structure of the invention in a third embodiment.

FIGS. 2 and 3 show cross-sections of vulcanized tires comprising a breaker structure according to the invention taking into consideration the other two embodiment variations of the above mentioned structure.

The structure utilized for the tire shown in FIG. 2, in addition to the cited layers 1 and 2 comprises a further layer 7, constructed similar to the previous ones and located in a radially outer position axially between the two rings 3.

Such a layer has no connection with the invention but to solely there to show that the structure can be obviously modified by varying the number and the reciprocal position of the layers according to any known shape, that the technician skilled in the field deems suitable.

On the other hand, as to the ring 3, this appears suitably constituted by two strips 8 and 9 radially overlapped, each constituted by two flanked bands, respectively 10,12 and 11,13.

It is obvious that the cords of the first group will be those of the bands 10 and 11 and, likewise, those of the second group will be those of the respective overlapped bands 12 and 13.

Now, taking into consideration FIG. 3, the ring 3 is still constituted by two radially overlapped strips 14 and 15 but, whereas the strip 14 is constituted by two flanked bands 16 and 17, the strip 15 is constituted by only one band 18; in the case taken into consideration, this band is put in correspondence of the underlying band 17 but applicable also in correspondence of the band 16.

Obviously, the position of the band in respect to the underlying bands determines the type of the reinforcing cords to be used in the band, said cords of the first group being always and only those in axially outer position.

However, the width of said band 18, that is that of the band in the radially, outer position, is not so rigidly connected to the width of the corresponding band in radially inner position so that, provided that the other bounding conditions of the invention are observed, the band 18 (upper) can also slightly protrude more (as illustrated) or less in respect to the width of the corresponding band 17 (lower).

In conclusion, in FIG. 3 is given the version of a tire having the reinforcing ring 3 with the axially outer edge coinciding with the corresponding axially outer edge of the layer 2, that is the largest among the underlying layers. Also in this case different positionings of the ring 3 are possible in respect to the edge of the underlying layers, being, however, the preferred solution that utilizes a reciprocal graduation among the edges of both of layers and strips of the ring, as illustrated at FIG. 2.

As already mentioned, the main characteristic of the invention is referred to the fact that in the vulcanized tire the modulus of elasticity of the cords must be non-increasing, when passing axially from one cord to another, moving from the axially outer edge to that inside of the strip.

To better understand this point one must consider, first of all, the fact that the breaker, as already said and shown, is manufactured by a flat process (see FIG. 1) then being expanded, that is shaped according to a curvilineal profile during the assembling on the raw carcass.

Moreover, the moulding phase of the tire that precedes the vulcanization process is executed by inflation of the carcass using fluid under pressure, so as to expand the crown of the tire and, often, procuring a further increase of the curvature, so that the breaker must undergo a "pull" of approximately 1.2% along the axially inner edge of the ring 3 and practically nill on its axially outer edge.

In conclusion, the 0° cords of the strips begin the vulcanizing process under differing conditions; the cords in the axially outermost position are in conditions practically equal to that of the deposition on the building drum; whereas the cords in the axially innermost position have already stretched to a considerable degree as compared to those axially outermost cords.

This difference of pull between the various cords of the strip by the manufacturing process of the breakers on the flat drum is, in principle, unchangeable. It could be eliminated only by a helicoidal deposition of the cord, coil by coil, with a continuous axial movement, on the already shaped carcass.

This second system, however, is not competitive—due to cost—with the flat manufacturing process, which is done utilizing bands and strips of cords already arranged, so that the manufacturing breaker system on the cylindric drum must be considered a preliminary, essential condition of the present procedure. It appears to be responsible for the already cited drawbacks which are now satisfactorily resolved by the structure of the invention.

In fact, the Applicants have discovered with surprise that the cords acting in the vulcanized tire, do not maintain the modulus which they possessed before the rubberizing and vulcanizing process. In other words, the vulcanizing phase inhibits the respective movements of the single metallic wires of the cord, which—in the uncovered cord or, in any case, non-vulcanized—allows stretchings of the cord which are exclusively connected to the variation of the geometrical shape of the cord (the reference is made to the load-elongation diagram: they are represented in the initial length, preceding the bend) conferring to the cord its high stretching.

On the contrary, in the textile cords the blocking of the movements relative to the single threads has relatively little effect, however, in the Hybrid cords comprising yarns in heat-shrinkable material (Polyamide) the final modulus of the cord appears much more affected by the reaction of the cord material during the vulcanizing process.

In conclusion, the vulcanizing phase confer to the cords utilized in the breaker of the invention, a modulus of elasticity different from that of the initial phase, and whose value depends from the "hystory" of the cord, that is by its own initial shape, by the pull undergone, and by the effects both of moulding and vulcanizing.

Consequently, it appears evident that the cords situated on the axially outer edge of the reinforcing ring, having had a hystory different from those situated on the axially inner edge, will have a modulus rather different from the axial inner cords.

Figure 4:
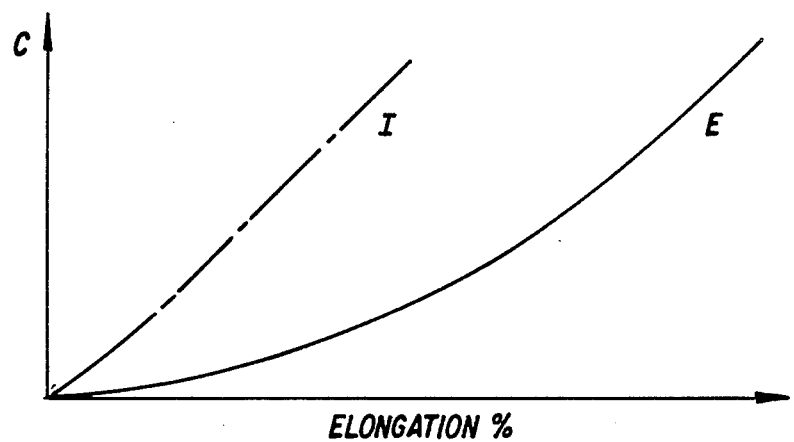
FIG. 4 shows, by a load-elongation diagram, the variation of the modulus of elasticity that happens after the moulding and vulcanizing process in the High Elongation cords usually employed in the known breaker structure.

The Applicants have experimentally verified their own intuition and the relative results are qualitatively illustrated at FIG. 4, which shows the load-elongation diagram for HE cords, exactly alike, taken from the vulcanized tire, respectively on the axially outer edge (E) and on the axially inner edge (I) of said reinforcing ring.

It should be noted that the cords on the inner edge have considerably less stretching than those on the outer edge and this fact explains now a certain type of failing previously inexplicable which occurred sometimes in known tires, for instance the low uniformity of the breaker structure, superficial bends along the inner edge of the reinforcing ring, corrugated wires and, in any case, not much stretched in along the breaker extremity, with the consequent, insufficient breakering of the edges of layers of inclined cords.

Thus, it appears evident that, to achieve an overall satisfactory behavior of the tire, the situation of the modulus of the cords in the strips must be exactly opposed to that represented in the diagram of FIG. 4: in other words it is necessary to have an axially high modulus on the outer edge of the ring (low stretching-high breakering result) and a modulus having values progressively decreasing (increasing elongations) towards the axially inner edge.

It is evident that it will not be possible to have strips comprising such cords, in the vulcanized tire, each cord having its own modulus perfectly suitable to the position of the cord in the strip; nevertheless, a very satisfactory solution is that already obtained in the structure of a invention by the use of the two types of the cords, one type per group, so as to have in the vulcanized tire two different modulus levels of the cords, being the value of said modulus approximately even in each group but of a value rather different in the two groups; such a result is perfectly achievable by utilizing the types of cords illustrated in the present description and of course, according to the suggested couplings.

Figure 5:
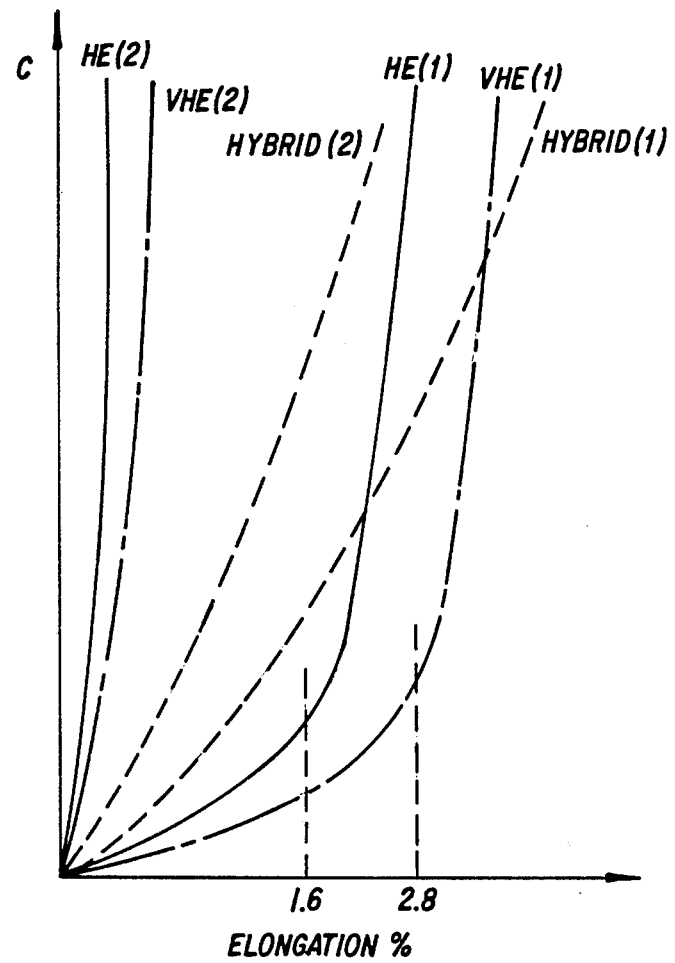
FIG. 5 illustrates the variation of the modulus of elasticity (load-elongation diagram) following the moulding and vulcanizing process of the tire that is undergone by the types of cords utilized in achieving the structure according to the invention.

FIG. 5 qualitatively illustrates the loading elongation diagrams for the type of cords proposed in the present description, examining for each type of cord (HE, VHE, HYBRID) the modulus trend before the vulcanizing (situation 1) and after the vulcanizing (situation 2) with all of the vulcanized cords being taken from the same point of the breaker structure or, preferably, from the reinforcing ring.

It was discovered that the vulcanizing process completely cancels the bend of the cords HE and VHE and confers to them a modulus higher than that of the Hybrid cord; the obvious consequence of this is the overturning of the initial situation.

In connection with that was illustrated until now, FIG. 5 justifies in full the efficiency of the already cited solutions HE-VHE, HE-HYBRID, VHE-HYBRID; however, in the last of these, it must be said that the breakering effect on the extremities of the radially inner layers of inclined cords will be, in any case, of lesser value than that achievable by the solution that foresees the cords HE in axially outer position, for which the convenience of the above mentioned solution VHE-HYBRID will have to be assessed case by case also in connection with the other characteristics of the tire, here not considered. It is also clear that in the axially outer position, exclusively metallic cords will have to be positioned and, precisely, of type HE or VHE as the textile cords, as known, doe not guarantee any resistance to compression stresses, particularly important as to the tires which are the object of the invention, when they run on curvilineal path.

The tire of the preferred embodiment of the invention has been demonstrated to be able to satisfactorily resolve the problem faced: in fact, the disposition of the 0° cords, according to a non-increasing trend (that is: constant or in decrease) of the values of the modulus has allowed the applicants to eliminate a few defects previously cited and to separate the characteristics of chilometrical yield by the requirement of a flattening of the contact area of the tire, allowing, on the contrary, to maintain an expanded value of the tread-band which emphasizes the advantages of the tire during running and to further increase, despite the expansion, the wear regularity characteristics and slow abradibility of the tread band.

It appears evident that the present description is given only by way of non-limiting example and it is not restricted to the illustrated embodiments of the present patent but refers to all the alternative embodiments and/or modifications which will be apparent to a technician skilled in this field.

We claim:

1. A tire for vehicle-wheels comprising
   a carcass of the radial type, a tread-band upon such carcass and a breaker structure positioned between the tread-band and the carcass,
   said breaker structure comprising at least two radially overlapped layers of metallic fabric, having a width substantially the same as that of the tread-band, reinforced by cords having an elongation at break between 2.6% and 3.2%, said cords being disposed parallel to one another in each layer and crossed with those in the adjacent layer, and said cords being symmetrically inclined in respect to the longitudinal direction of the tire at an angle between 10° and 30°,
   said breaker structure also including two axially spaced reinforcing rings, wherein each ring is disposed at one lateral side of said breaker structure, in a position radially outward in respect to said at least two metallic fabric layers,
   each of said rings having an axial width between 7% and 40% of the axial width of said breaker structure, each ring comprising at least a strip of rubberized fabric reinforced with cords disposed in the circumferential direction of the tire, each strip having an axial inside edge and an axial outside edge, said strip cords having an elongation at break of a value higher than that of the reinforcing cords of said metallic fabric layers, said strips comprising two axially flanked groups of said reinforcing cords, outer and inner groups respectively, the positioning and treatment of the cords being such that in the vulcanized tire the modulus of said cords is approximately equal to one another within each group and substantially different from those of the flanked group, the group with cords having the greater modulus being disposed in the strip nearest the axial outside edge of that strip.

2. Tire according to claim 1, in which the cords of the outer group are high-elongation, lang lay type, metallic cords.

3. Tire according to claim 1 in which the cords of the axial inner group of at least one strip are metallic cords of said high elongation type.

4. Tire according to claim 1 in which the cords of the axial inner group are hybrid textile cords comprising aramide and polyamide yarns.

5. Tire according to claim 4 in which the abovementioned cords comprise two yarns of aramide and one yarn of polyamide helicoidally twisted to one another, said aramide yarns presenting a residual torsion in the finished cord not exceeding 0.5 turns per inch, said polyamide yarn presenting a residual torsion, with opposed direction to that of aramide yarns, not less than 1.5 turns per inch.

6. Tire according to claim 1 in which the axial width of the outer group of cords is between 30% and 70% of the total width of the strip.

7. Tire according to claim 1 in which each ring comprises at least two radially overlapped strips.

8. Tire according to claim 1 in which the cords of at least one group are distributed in a plurality of bands radially overlapped.

9. Tire according to claim 1 in which the axially outer edge of said strips coincide with an axially outer edge of a layer of said at least two metallic fabric layers which has the smallest width among said metallic fabric layers.

* * * * *